May 22, 1934.  A. L. R. ELLIS ET AL  1,960,215
METHOD OF AND APPARATUS FOR PRODUCING REFRACTORY BODIES
Filed Nov. 30, 1932   3 Sheets-Sheet 2
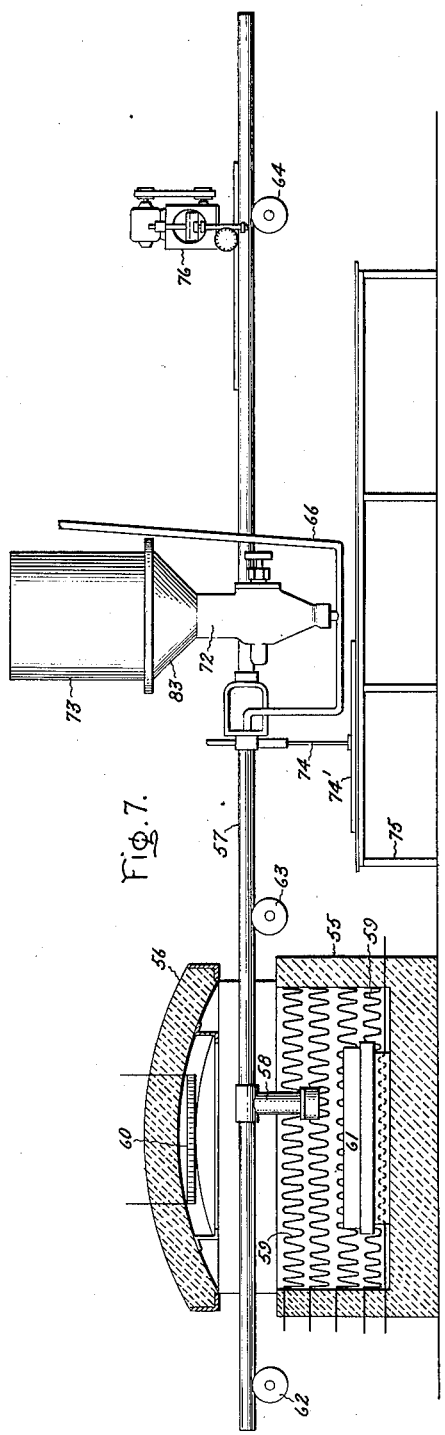
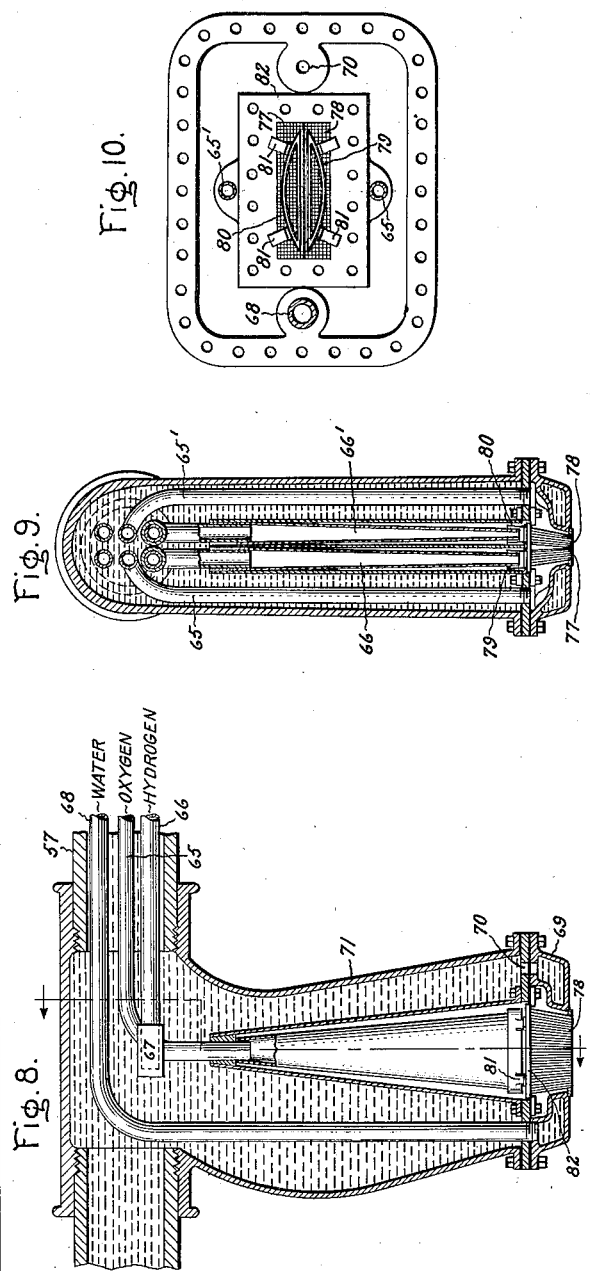
Inventors:
Alvarado L.R. Ellis,
Gunnar A.F. Winckler,
by Charles N. Mullar
Their Attorney.

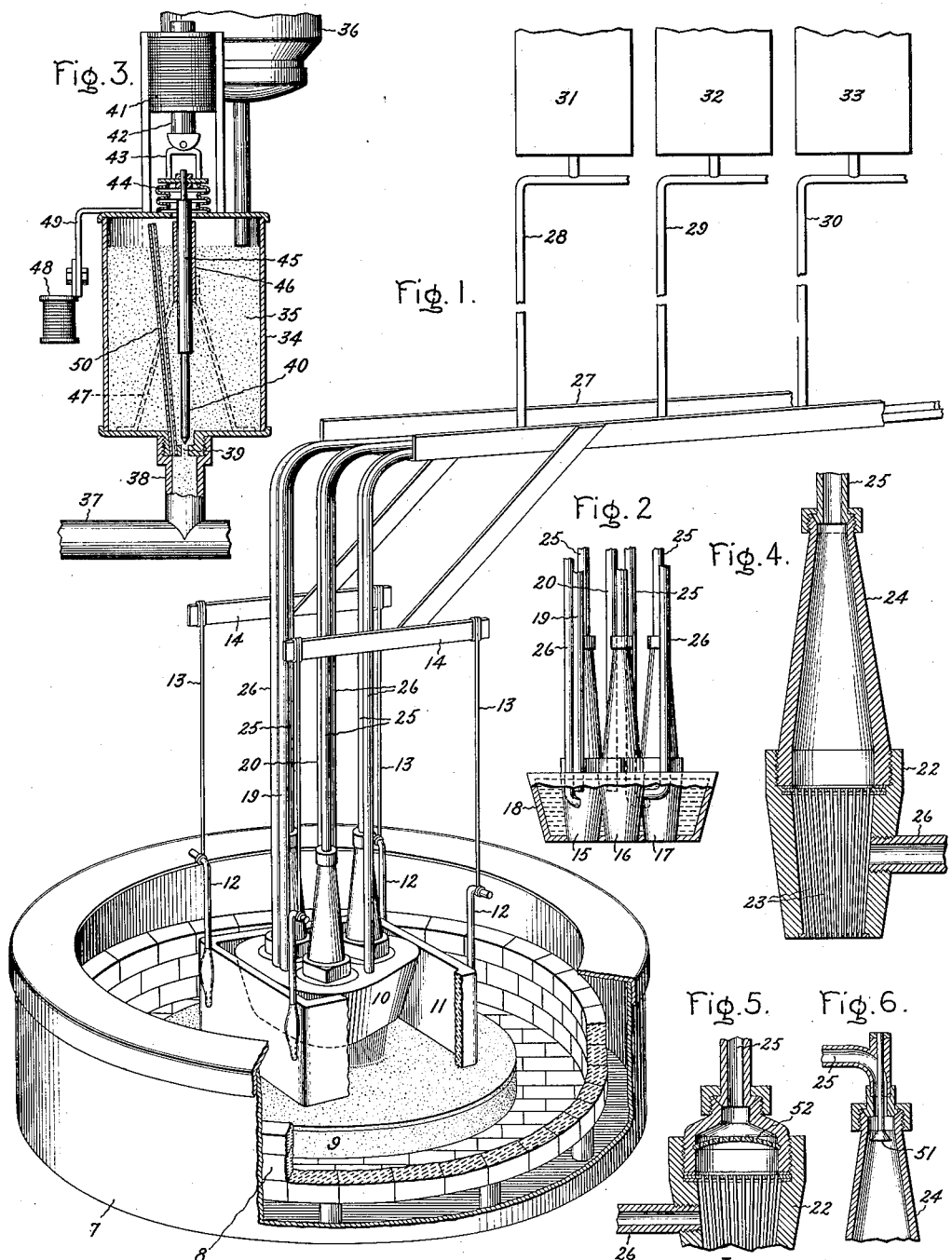

May 22, 1934.    A. L. R. ELLIS ET AL    1,960,215
METHOD OF AND APPARATUS FOR PRODUCING REFRACTORY BODIES
Filed Nov. 30, 1932    3 Sheets-Sheet 3
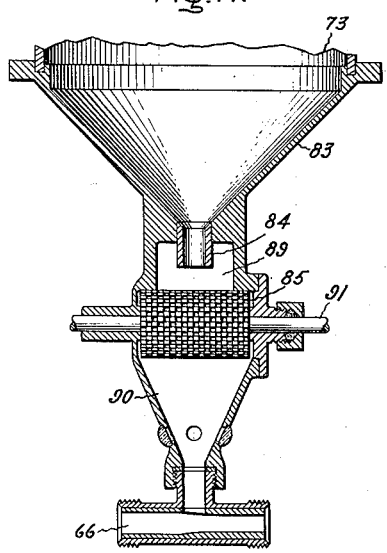
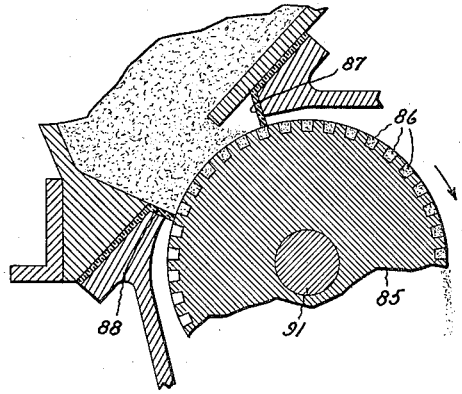
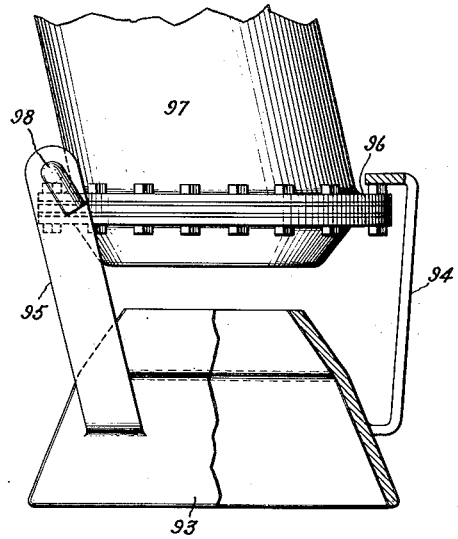
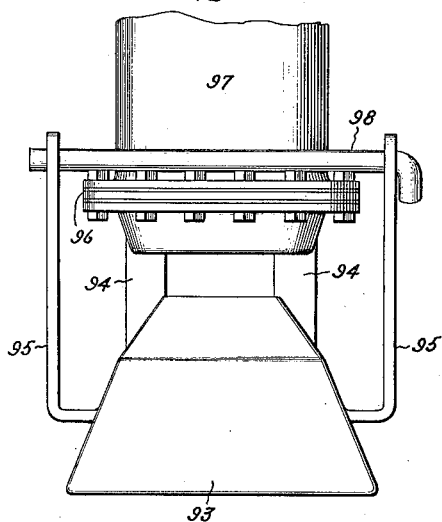
Inventors:
Alvarado L.R. Ellis,
Gunnar A.F. Winckler,
by
Their Attorney.

Patented May 22, 1934

1,960,215

UNITED STATES PATENT OFFICE 1,960,215

METHOD OF AND APPARATUS FOR PRODUCING REFRACTORY BODIES

Alvarado L. R. Ellis, Swampscott, and Gunnar A. F. Winckler, Worcester, Mass., assignors to General Electric Company, a corporation of New York Application November 30, 1932, Serial No. 645,028

18 Claims. (Cl. 49—78.1)

The present application is a continuation in part of application Serial No. 453,362, filed May 7, 1930. The invention relates to the production of homogeneous masses of vitreous or other refractory material by accretion at a fusing temperature of particles of such material to produce homogeneous products. Our invention will be explained by particular reference to the production of articles from vitreous silica although it is not restricted in its application to silica alone.

When heretofore refractory products, such as vitreous silica, for example, have been produced by the fusion and consolidation of particles of silica definite limitations in the rate of output have been encountered. In accordance with the process described in United States Patent 1,869,163 of Berthold F. Niedergesass, patented July 26, 1932, which is assigned to the same assignee as the present application, particles of silica are projected through an oxy-hydrogen flame in which the component gases are so intermingled that the particles projected therethrough are caused to be fused by the flame at the impingement of the flame with a body of silica. As described in this patent, foundations of silica (not necessarily bubble-free) may be provided with a coating of high grade, substantially bubble-free vitreous silica, the process being applicable to the production of astronomical mirrors. The present invention constitutes an improvement over the process and apparatus described in this United States patent.

As a consequence of our present invention the efficiency and rate of deposition of silica by the process of spraying finely divided silica upon a heated surface has been greatly increased, and the quality of the product has been markedly improved. The amount of fused silica in massive state formed with a given amount of gas can be increased under the most favorable conditions at least a hundred-fold by the practice of our invention.

This enormous increase in the efficiency of this process, which will be referred to briefly as the spray-accretion process, is produced by the cooperation of a number of novel features. One of these novel features is the employment as the source of heat of a flame constituted by a group or bundle of fine streams of interspersed combustible and combustion-supporting gases flowing in substantially parallel relation to one another.

Another feature of our invention is the separate regulation of the velocity of the burning gases and the rate of feed of the comminuted silica into the fusion zone to produce an optimum effect. In other words, the feed of the silica should be independent of the flow of the gas.

Another feature of our invention is the provision of heat-reflectors spaced closely adjacent the fusion zone to conserve heat.

Another feature of our invention comprises the employment of distributing means whereby the comminuted silica is caused to be properly spread in the fusion zone. Without such distribution ridges will be formed in the deposited silica which upon subsequent traverse of the burner will be unequally heated and result in the inclusion of bubbles in subsequently deposited silica.

The various features of our invention will be better appreciated by reference to the accompanying drawings and the accompanying description.

In the drawings Fig. 1 is a side elevation partly in section of a burner, feed apparatus and furnace, showing an astronomical mirror blank the surface of which is provided with a layer of clear vitreous silica in the manner of our invention; Fig. 2 is a side view partly in section of a group of three burners provided with fluid cooling means; Fig. 3 is a side elevation partly in section of a feed apparatus whereby comminuted silica or the like is supplied to the burners; Fig. 4 is a longitudinal section of a burner adapted for carrying out our invention. Figs. 5 and 6 are fragmental views of burners showing particularly two forms of spreaders or distributors for the comminuted silica or the like; Fig. 7 is a diagrammatic view, partly in section of an assembly including a burner, an enclosing furnace, a silica feed device, and a reciprocating mechanism for the burner; Figs. 8 and 9 are longitudinal sectional views, taken at right angles to one another, of a modification of a burner and conduits connected thereto; Fig. 10 is an end view of the burner (a surrounding cooling duct having been removed); Fig. 11 is an elevation partly in section of another form of feed device; Fig. 12 is a fragmental sectional view on a larger scale of such feed device taken at right angles to the plane of Fig. 9; Fig. 13 is an elevation partly in section of a heat shield for the burner; and Fig. 14 is an elevation of such shield from another angle.

The arrangement shown in Fig. 1 comprises a circular sheet metal housing 7 enclosing an inner structure 8, constituted of fire brick or other suitable refractory material upon which rests a mirror blank 9 consisting of fused silica which need not be free from bubbles (and may be formed, for example, by the agglomeration of sand in an electric furnace) upon which a facing or coating of high grade, clear, transparent vitreous silica is to be applied, or may be formed of relatively large pieces of silica fused together as described in Winckler U. S. Patent No. 1,888,341, issued November 22, 1932. The structure 8 constitutes both a support and a heat-insulating enclosure for this mirror blank which preferably is heated during the facing operation to a temperature of about 800° to 1100° C. Supported above the mirror blank is a multiple burner 10 surrounded by a shield 11 of highly refractory material which serves to conserve and concentrate the heat developed by the flame emanating from the composite burner 10. This shield 11 which may consist of slabs or plates of fused silica is supported by holders 12, also consisting of vitreous silica, which are joined by fusion to the edges of the shield 11 and are held by wires 13 connected to cross-bars 14 of a suitable supporting structure. As shown in Fig. 2, the multiple burner 10 comprises as an illustrative example the group of three unit burners 15, 16 and 17 provided with a casing 18, the space between the burners and the casing being supplied with water or other cooling fluid through the pipes 19 and 20. As shown in Fig. 4, each of the burners comprises a casing 22 in which is affixed a group of tubes 23 supplied with a combustible gas through a conical head 24 attached to supply conduit 25. Surrounding the tubes 23 are spaces through which is supplied a combustion-supporting gas through the inlet tube 26. The structural details of such a burner are described in United States Patent 1,721,381 to A. L. R. Ellis on July 16, 1929.

Preferably, as the combustible and combustion-supporting gases respectively hydrogen and oxygen are employed. In place of hydrogen dissociated ammonia may be used or in fact also the mixture of hydrogen and carbon monoxide which results from the reaction of a hydrocarbon gas and water vapor in an electric furnace and commercially known as Electrolene. It is not necessary that the hydrogen (using the term in a general sense as a typical suitable fuel gas) should be supplied through the tubes 23 and the oxygen through the spaces surrounding the tubes as an inverse arrangement may be employed, but in any event the ducts supplying the hydrogen should have such cross-section relative to the ducts supplying the oxygen that these gases may be supplied in the ratio of two volumes of hydrogen to one of oxygen, so that substantially complete combustion results independently of atmospheric oxygen. By this arrangement an exceedingly hot, quiet flame is produced by a compact bundle of streams of combustible gas intimately intermingled with streams of the combustion-supporting gas, both sets of streams flowing in substantially the same direction and therefore flowing without any retarding effect upon each other. Under these conditions a flame of maximum heating effect may be obtained, which has a substantially uniform heating effect throughout its cross-section, and may be made as large in cross-section as desired in order to efficiently heat a large area. The streams of the interspersed gases being relatively fine, produce a large surface of contact between the respective sets of gases as the combustion of the gases occurs at the contact of the two sets of streams with respect to each other.

A hot spot of substantially uniform temperature is produced at the impingement of the streams with the plate of silica 9 and therefore a maximum fusing effect is produced upon the finely divided silica which is supplied to the flame in a manner to be presently described. In other words, the intermingling and closeness of spacing of finely divided streams of gases, such as hydrogen and oxygen, produces substantially the same effect as would be obtained by the combustion in a uniform mixture of hydrogen and oxygen in a combustion-supporting ratio. The heating effect of such a flame, which may be made as large as desired by simply increasing the number of the orifices supplying the gas, is further enhanced by the shielding effect of the baffle plates 11 which materially reduces the mixing with the flame of the relative cooler gases surrounding the flame, and also by their heat reflecting action.

It is found that whether only a single burner is used or a number of burners that surrounding said burner or burners with a shield, such as baffle 11, effectively increases the temperature of the hot spot or spots produced by the burner or burners. Hence, the rate at which silica can be laid down, and at the same time remain bubble-free, is relatively increased. This rate is limited only by the requirement that the heat energy supplied by the burner should also consolidate by fusion the silica after deposition. As to the spacing of the burners one to another, the object is to secure as nearly as possible a continuous hot spot produced by the particular proximity of the burners with respect to each other, so that there will be practically no inclusion of cooler ambient gas into the flame.

The gas supplying tubes 25, 26 are held by a support 27 above the burners. Communicating with the conduits supplying either the combustible or combustion-supporting gas, preferably the former, for the respective burners are tubes 28, 29 and 30 which supply finely divided silica, finely divided glass, or materials which by combustion at high temperature produce the desired vitreous material to be built up by accretion. These tubes communicate with reservoirs 31, 32 and 33 containing a charge of the desired materials.

In Fig. 3 is shown one form of reservoir and feed device suitable for holding and supplying the finely divided material to be deposited. As illustrated in this figure, the feed device comprises a receptacle 34 containing a charge 35, which in the particular case of the manufacture of a silica mirror blank consists of comminuted silica. This material may be conveniently made by heating crystalline quartz of desired purity to a red heat and then quenching the quartz in water, thereby producing a friable product which may be easily crushed to the desired fineness. We prefer to employ comminuted quartz which will pass thru a sieve of about 200 meshes per square inch, but prefer to exclude very fine material or dust and the crushed material may be freed from the dust by levigating with water. For some purposes material which is so fine that it can only be passed by a screen of about 600 meshes per square inch should be rejected but no general rule can be given as even very fine material can be used in some cases. The finely divided material when thoroughly dried is supplied to the receptacle 34 through a hopper 36. It is fed through a conduit 37 which in the device illustrated preferably is constituted by the hydrogen supply conduits of the burner by which the finely divided material is to be supplied and fused.

In the branch pipe 38 leading to the conduit 37 is a needle valve 39 communicating with the bottom of the receptacle 34. A flow of material into the flame is maintained continuously through the needle valve by a reciprocating needle 40 which is maintained in constant vibration by an electromagnet 41. The needle 40 is connected to the armature 42 of the electromagnet by means of a yoke 43, which is attached to the receptacle 34 by means of a sylphon diaphragm 44. The upper end of the needle 40 is reinforced by member 45 of larger diameter to slide in the bearing sleeve 46 supported by the bearing pedestal 47 attached to the floor of the feed box. The electromagnet 41 is supplied with alternating current of suitable frequency whereby its armature 42 is maintained in constant vibration thereby agitating the finely divided material at the outlet of the valve thus preventing clogging of the opening. An additional vibrating magnet 48 is attached by a plate 49 to the receptacle 34 in order to keep up a general agitation of the material in the feed receptacle 34 thereby assisting uninterrupted flow of the material to the burner. Equalization of gas pressure between the conduit 37 and the space above the charge 35 takes place through a fine tube 50. The rate of feed of the finely divided material should be so chosen with respect to the volume and velocity of the gas currents that fusion of the particles occurs at the impingement of the flame, accompanied by the consolidation or coalescence of the particles.

The conical shape of the header 24 leading from the gas supply conduit 25 to the bundle of conduits in the burner promotes the spreading of the finely divided material in the burner. The spreading of this material may be further enhanced by a conical deflector as shown at 51 in Fig. 6. In some cases, especially when it is not convenient to employ a relatively long conical header for the burner, a type of spreader, such as shown in Fig. 5, may be employed consisting of a plate 52 having a plurality of perforations, as indicated, through which the finely divided silica or the like passes to the burner tubes. A preferred form of distributor whereby undesired concentration of silica near the outer zone of the burner is avoided is shown in Figs. 8, 9 and 10.

In the fabrication of a quartz mirror, in which case it is desired to produce a substantially uniform layer of fused or vitreous silica upon a supporting base, as illustrated in Fig. 1, the multiple burner is caused to be traversed back and forth over the surface of the mirror blank. The three burners in the multiple unit 10 are spaced in triangular relation to one another. As the unit traverses linearly across the mirror blank the flame of the burner which first encounters the supporting surface performs the function of heating up a portion of the blank without depositing sprayed material. The surrounding area of the blank benefits by the radiated heat from this burner. As the unit moves forward (say toward the observer in Fig. 1) the two rear burners supply their quota of sprayed and fused material thus cooperating in the formation of the fused coating of deposited material. It is to be understood, however, that other arrangements of multiple burner units may be employed. For example, three burners may be arranged in line with one another to increase the width of the deposited layer, or one large burner may be used to accomplish the result.

In some cases the housings 7 and 8 which serve to keep the blank 9 at more uniform temperature may be omitted. If it is desired to form by the spray-accretion process a slug of clear vitreous silica or a similar refractory material, then the multiple burner unit may be slowly moved upwardly as the accretion of the silica proceeds thereby eventually forming a slug or bar which may be subsequently fabricated into articles of desired shape by well known processes. In the making of such slugs it is not so important to provide the housings 7 and 8.

We prefer for the manufacture of large bodies, such for example as astronomical mirrors, to employ an electrically heated furnace for heating the article being fabricated, as shown in Fig. 7. As shown in this figure, the furnace housing 55 is provided with a dome-shaped roof 56 having openings therethrough which may pass a support 57 for the burner 58. During the deposition of the silica the support 57 and the burner 58 are caused to traverse over the surface to be coated by any suitable means (not shown). Upon the interior walls of the housing 55 beneath the roof 56 and beneath the blank 61 are provided electric resistance heaters 59, 60 for heating the interior of the furnace and the blank 61 to a required high temperature. The support 57, which may consist of metal tubing, is suitably supported, as indicated at 62, 63 and 64. Through the tubing 57 passes water, or other cooling fluid, as shown in Fig. 8, and also gas supply conduits 65, 66. An offset joint 67 is provided at the bend of the conduit 66. Silica becomes packed in the offset portion and acts as a wear-resisting deflector for the silica powder being carried by the gas current. A third conduit 68 supplies water to a jacket 69 protecting the base of the burner from excessive heat, the water returning through the orifice 70 into a space within the jacket 71 surrounding the burner proper and communicating with the hollow support 57.

The finely divided silica is supplied by a feed device 72 (later described in detail), which communicates with a reservoir 73. As shown in Fig. 11, the silica powder is fed direct into a hydrogen conduit 66. Only one hydrogen conduit is shown in Fig. 7, although as shown in Fig. 9 more than one may be employed. Mounted on the support 57 is a pointer 74 whereby in conjunction with the plate 74', which is supported on a base 75, the position of the burner 58 with respect to the blank 61 is indicated. The burner preferably is caused to be oscillated over the work by a suitable mechanism 76, such as a motor operated slotted yoke crank mechanism. As such mechanism is well known (being sometimes termed a Scotch yoke) it will not be described in detail.

The burner, shown in detail in Figs. 8, 9 and 10, while similar in construction as the burners shown in Figs. 4 and 5, differs in configuration. It consists of two groups, or bundles, of tubes 77, 78, which are respectively supplied with hydrogen by the conduits 66 and 66' and with oxygen by the conduits 65 and 65'. The deflectors 79, 80, secured to the burners, serve to secure the most efficient distribution of the silica. These deflectors are supported close to, but spaced away from the gas orifices at the face of the burners by the ears 81, which are secured to the plate 82 into which the burner tubes are fitted. Without such deflectors the silica deposition will occur unevenly and ridges will develop which become steadily more pronounced. As indicated above, these ridges result in deficient heating of the silica on their sides and as a result gas bubble inclusions. This undesirable result is avoided by the deflectors 79, 80, which spread the silica in the flame and maintain a predetermined distribution of silica with respect to the deposition area of the work.

The feed device shown in Figs. 11 and 12, differs from the feed device shown in Fig. 3 by providing mechanism whereby comminuted silica or the like is fed into the gas stream in predetermined quantities independent not only of the velocity of the gas stream but also of the conditions of flow of the silica itself, such, for example, as its fineness of sub-division, degree of moisture and the quantity present in the reservoir. In the device shown in these figures the silica is fed from the reservoir 73 through a funnel 83, an outlet conduit 84 upon a rotating cylinder 85. A number of small pockets 86 are provided on this cylinder which become filled with the finely divided material as the cylinder rotates in clockwise direction, as shown in Fig. 12. The excess of comminuted material is removed from the periphery of the cylinder by the scraper 87 which may consist of rubber or other resilient material. A similar sheet of resilient material 88 on the opposite side of the outlet from the feed receptacle 89 prevents leakage of the silica past the feeding cylinder. When the pockets 86 are carried past the scraper 87 they deliver their content of finely divided silica to the conduit 90 which communicates with the hydrogen feed pipe 66, the silica then being carried by gas current to the burner 58. The feeding cylinder 85 is rotated through any suitable source of power applied to the shaft 91.

In Figs. 13 and 14 are shown an improved modification of the heat deflector or conservator for the fusion zone. The heat deflector 93, shown in these figures as having a conical shape, is supported by hangers 94, 95 from the flange 96 of the burner 97. It will be observed that the deflector shown in these figures is supported at some distance below the orifices of the burner but is close to the heated area below it. It may be removed after withdrawing the lock bar 98 by sliding the hangers 94 and 95 past the flange of the burner.

The significance of the present invention can be better appreciated by a consideration of its advantages in connection with the construction of large astronomical mirrors made by providing a base of silica which need not be transparent with a facing of transparent, bubble-free silica by the spray-accretion process. For the building up of a given layer of high grade silica on a given mirror blank thirty-eight million cubic feet of gas would have been required by the processes and apparatus of the prior art. A gasometer of approximately 100 feet diameter and 4900 feet height would have been required to store this enormous amount of gas. By the practice of our invention the required amount of gas is reduced to about four hundred fifty thousand cubic feet. This amount of gas can be stored in a gasometer of the same diameter which is only 65 feet in height. The advantage of the increased rate of deposition of silica effected by the practice of our invention is even greater than the economy of fuel gas. A given piece of work which can be carried out in about twelve days by the practice of our invention would have required seven years by the processes and apparatus of the prior art. If it is borne in mind that spray-deposition of silica requires maintenance of the support on which the deposition takes place to a temperature of about 1000° C. the revolutionary character of our invention will be apparent.

What we claim as new and desire to secure by Letters Patent of the United States is:

1. The process of forming substantially homogeneous masses of refractory material from particles of said material which consists in producing a flame by the combustion of combustible and combustion-supporting gases, said gases being delivered as a plurality of substantially parallel jets, the jets of one gas being intimately intermingled and closely adjacent to the jets of the other, uninterruptedly feeding the particles to be fused into said flame at a rate which is independent of the velocity of said gas currents, causing said particles to be spread at the input orifices of said jets in predetermined distribution with respect to said orifices, causing said flame to impinge on a foundation and maintaining the delivery of said gases in such ratio and at such velocities that said particles will be fused solely by said flame within its impingement area upon said foundation.

2. The process of forming substantially homogeneous masses of silica by the accretion of particles of said material which consists in introducing said particles as a continuous stream into a flame produced by the combustion of a plurality of parallel jets of combustible gas and a plurality of parallel jets of combustion-supporting gas, the jets of said two kinds of gas being arranged in intermingled relation to produce a flame having a substantially uniform cross-sectional temperature, spreading said particles in said flame in predetermined distribution, causing said flame to impinge upon a refractory support, delivering said gases in such ratio and at such velocities as to produce a flame condition which will cause said particles to be consolidated by fusion upon said support, and regulating the feed of said particles with relation to the gas flow to produce an efficient rate of accretion.

3. The process of forming masses of vitreous material which consists in producing a flame by intermingled combustible gas and combustion-supporting gas, said gases being in such ratio that substantially complete combustion occurs, substantially excluding ambient gases, uninterruptedly feeding a charge of powdered vitreous material into said flame, and building up said vitreous material in a fused state into a homogeneous mass by the heating effect of said flame.

4. The process of forming masses of vitreous silica which consists in conveying a plurality of jets of combustible gas and combustion-supporting gases in intermingled substantially parallel relation to cause substantially complete combustion of the gases substantially excluding access of extraneous air, feeding a steady stream of powdered silica into the flame, and building up said silica in a fused state into a homogeneous mass by the heating effect of said combustion.

5. An apparatus for agglomerating by fusion particles of refractory material which comprises the combination of a burner constructed to deliver in intermingled relation a compact bundle of parallel streams of combustible gas and parallel streams of combustion-supporting gas, the orifices of said streams being so closely spaced that a substantially uniform temperature is produced throughout a cross-section of said flame, and means for uninterruptedly supplying and distributing particles of refractory material at the fusion zone to utilize to an efficient extent the heating effect of a flame produced by said gases for the fusion and incorporation into a homogeneous mass of said particles.

6. An apparatus for agglomerating by fusion particles of refractory material which comprises the combination of a burner constructed to deliver in compact intermingled relation a plurality of parallel streams of combustible gas and a plurality of parallel streams of combustion-supporting gas, the jets of said two kinds of gases being closely adjacent and intimately intermingled, feed means for supplying to said burner a supply of particles to be fused by a flame formed by the burning of said gases, means located between said feed means and said burner for distributing said particles in said flame, and means for oscillating said flame.

7. An apparatus for agglomerating by fusion particles of refractory material which comprises the combination of a burner constructed to deliver in intermingled relation a bundle of substantially parallel jets of combustible gas and intermingled, parallel jets of combustion-supporting gas, continuously acting feed means operatively independent of the velocity of said gas for feeding into at least one of said gases particles to be fused, and a deflecting baffle located adjacent the input orifices of said burner for distributing said particles in a flame produced by said gases at the output orifices of said burner.

8. An apparatus for agglomerating by fusion particles of refractory material which comprises the combination of a burner constructed to deliver in intermingled relation a plurality of jets of combustible gas and a plurality of jets of combustion-supporting gas, means for feeding into said burner a continuous stream of particles to be fused, and shielding means closely surrounding the area heated by said burner whereby an impingement area of a flame produced by said burner on an object is maintained at a higher temperature.

9. An apparatus for agglomerating finely divided refractory material by fusion comprising a burner constructed to deliver in intermingled relation finely divided jets of a combustible gas and of a combustion-supporting gas, means for feeding into said burner particles of a material to be fused, said feeding means comprising a receptacle provided with a valve, and means for maintaining a movable member of said valve in vibration.

10. The combination of fusion means, a device for supplying thereto comminuted material having an outlet duct communicating with said means and vibrating valve therein for producing a continuous flow of comminuted material through said duct.

11. An apparatus for producing homogeneous masses by the fusion and accretion of particles of refractory material comprising a gas burner, a device for supplying thereto comminuted material, said device having an outlet duct communicating with said burner, a core member adapted to vibrate longitudinally in said outlet duct, and electromagnetic means for maintaining said member in vibration.

12. An apparatus for producing vitreous silica as clear masses substantially free from bubbles which comprises the combination of a plurality of contiguous burners each of which is constructed to deliver in intermingled relation a plurality of jets respectively of a combustible gas and a combustion-supporting gas, an enclosure closely surrounding said burners whereby the temperature of an impingement area on an object of a flame produced by said burner is increased, means for supplying to a fusion zone heated by the burning of said gases a stream of silica particles, and a common supporting structure for said burners and said enclosure arranged for traversing said burners and enclosure over an area of said object.

13. The process of forming masses of vitrous silica which consists in producing a bundle of substantially parallel closely adjacent, intermingled, fine streams of combustible and combustion-supporting gases feeding particles of silica into a flame produced by said gases at a constant rate, distributing said particles with respect to the cross-section of said flame, causing said flame to impinge on a support which may be heated to a temperature at which fusion and coalescence of said particles will occur, and oscillating said flame over the impingement area of said support.

14. The process of consolidating particles of refractory material into homogeneous masses by accretion which consists in causing combustible and combustion-supporting gases to flow as intermingled parallel jets which are so closely adjacent that when such gases are burned a flame of substantially uniform heating effect throughout is formed, feeding the particles of refractory material into said flame, causing said flame to impinge on a support, independently heating said support as a whole to an elevated temperature, maintaining the ratio and velocities of said gases at values at which a fusion temperature for said particles will be maintained by said flame at the area of impingement on said support and locally shielding said heated area to reduce loss of heat by convection and radiation.

15. A silica fabricating apparatus comprising the combination of a feed device having a supply chamber for supplying thereto comminuted silica, an outlet conduit for said chamber, a conveyor having pockets positioned in said conduit, means for removing excess silica from said pockets, means for transferring said pockets from a charging position communicating with said supply chamber to a discharging position communicating with said outlet conduit and a gas burner adapted to fuse silica connected to said outlet conduit.

16. A silica fabricating apparatus comprising the combination of a feed device having a supply chamber for supplying thereto comminuted refractory material to be fused, an outlet conduit for said chamber leading to said burner, a rotatable cylinder having a plurality of depressions positioned at the inlet of said conduit, means for scraping excess material from said pockets when said cylinder is rotated to transfer said depressions from a charging to a discharging position in said conduit and a silica fusion means connected to said conduit.

17. Apparatus for agglomerating by fusion particles of refractory material which comprises the combination of a burner constructed to deliver in intermingled relation a plurality of streams of combustible gas and a plurality of streams of combustion-supporting gas, means for uninterruptedly supplying particles of refractory material at the fusion zone at a maintained rate which will utilize to an efficient extent the heating effect of a flame produced by the gases for the fusion and incorporation into a homogeneous mass of the particles, and baffle means for predetermining the distribution of said particles in said flame.

18. In a silica fabrication apparatus, a conduit having sections joined at an angle to one another, means for conveying a gas through said conduit, and a deflector composed of packed silica powder positioned at the joint between said sections to resist the abrading effect upon said joint of silica particles conveyed by said gas through said conduit.

ALVARADO L. R. ELLIS.
GUNNAR A. F. WINCKLER.